United States Patent [19]

Yoshida et al.

[11] Patent Number: 5,150,431
[45] Date of Patent: Sep. 22, 1992

[54] DEVICE FOR CONVERTING NORMAL OUTLINE DATA INTO COMPRESSED OUTLINE DATA, OR VICE VERSA

[75] Inventors: Hitoshi Yoshida, Kohnan; Naoyuki Kawamoto, Tajimi; Takahiro Kanegae, Nagoya; Kazuma Aoki, Kasugai, all of Japan

[73] Assignee: Brother Kogyo Kabushiki Kaisha, Nagoya, Japan

[21] Appl. No.: 644,607

[22] Filed: Jan. 23, 1991

[30] Foreign Application Priority Data

Jan. 26, 1990 [JP] Japan .................................. 2-16454

[51] Int. Cl.⁵ .............................................. G06K 9/36
[52] U.S. Cl. .......................................... 382/56; 382/22; 382/25
[58] Field of Search .................. 340/731, 735; 382/22, 382/23, 24, 25, 56; 395/110, 128, 150

[56] References Cited

U.S. PATENT DOCUMENTS

| | | | |
|---|---|---|---|
| 4,189,711 | 2/1980 | Frank | 382/56 |
| 4,542,412 | 9/1985 | Fuse et al. | 382/56 |
| 4,550,438 | 10/1985 | Convis et al. | 382/56 |
| 4,771,474 | 9/1988 | Takashima et al. | 382/24 |

Primary Examiner—Jose Couso
Attorney, Agent, or Firm—Oliff & Berridge

[57] ABSTRACT

A data compressing device for preparing compressed outline data from normal outline data representative of an outline of a character which consists of a plurality of segments connected end to end so as to form a closed loop. The normal outline data includes coordinate data representative of X and Y coordinate of segment specifying points which determine positions of the segments, and segment type data indicative of a type of each segments. The device is adapted to determine whether or not all of a plurality of successive points of the segment specifying points which successive points are successively located along the closed loop have a same X or Y coordinate, and omits the X or Y coordinate for at least one of those successive points, to thereby prepare the compressed outline data, if all of the successive points have the same X or Y coordinate which is equal to the X or Y coordinate to be omitted. Also disclosed is a device adapted to convert the compressed outline data into the normal outline data, by restoring the X and Y coordinates omitted in the compressed outline data.

13 Claims, 8 Drawing Sheets

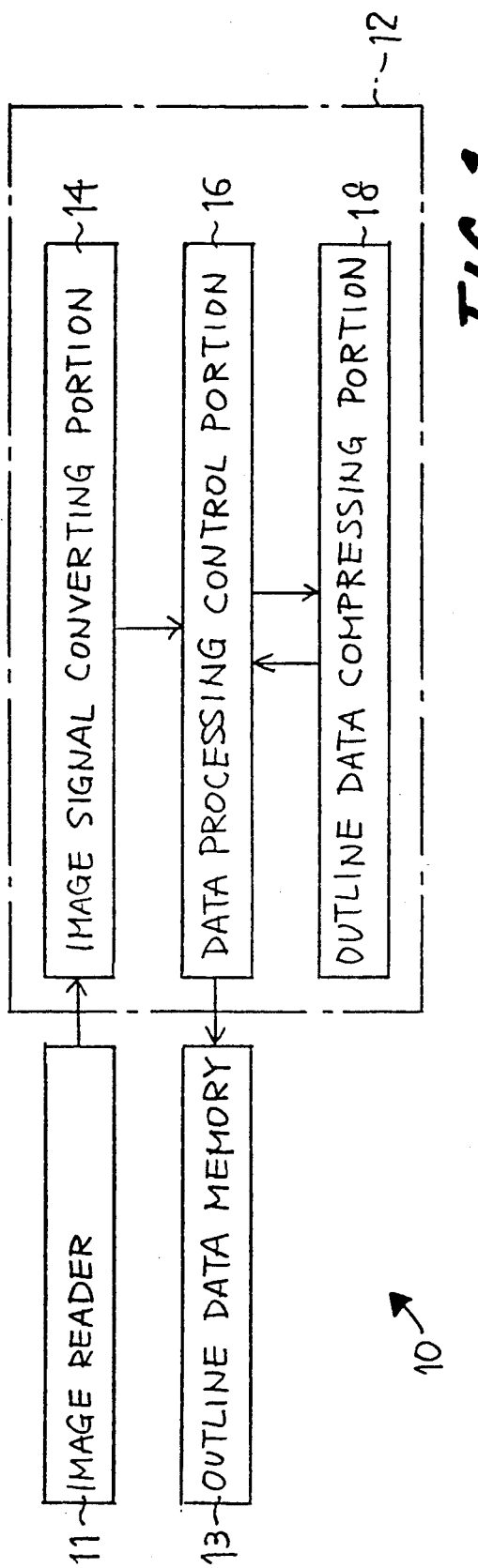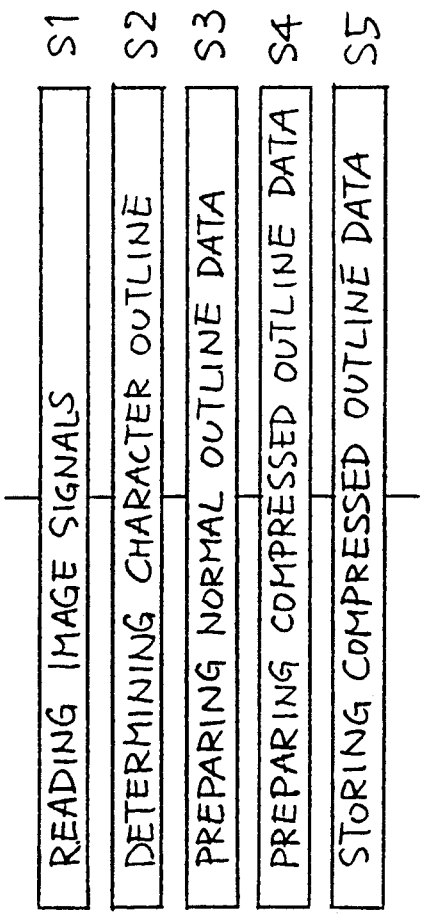

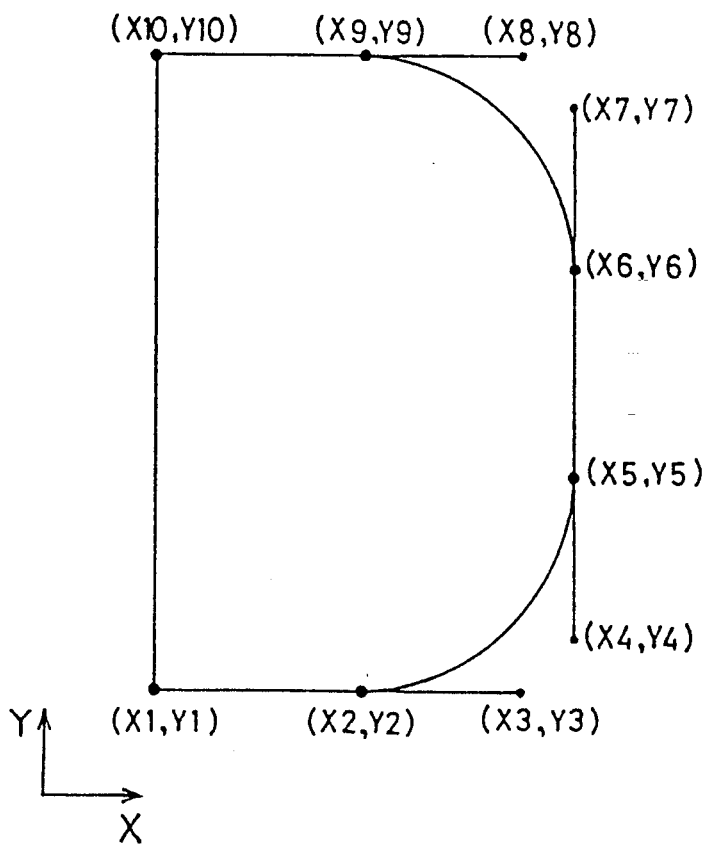

ced outline data, or vice versa" should be the title.

DEVICE FOR CONVERTING NORMAL OUTLINE DATA INTO COMPRESSED OUTLINE DATA, OR VICE VERSA

BACKGROUND OF THE INVENTION

1. Field of the Invention

The present invention relates to a device for converting normal outline data representative of an image outline consisting of a plurality of mutually connected segments, into compressed outline data whose volume is smaller than that of said normal outline data. The invention relates also to a device for converting the compressed outline data into the normal outline data.

2. Discussion of the Prior Art

In the field of printing, displaying or otherwise reproducing characters such as letters and symbols and other visible representations in a matrix of dots, there is known an output device which operates according to outline data representative of outlines of the characters and other visible images (hereinafter simply referred to as "characters"). When code signals are received by the output device, corresponding sets of outline data are read out from a memory, and are converted into respective sets of dot data which indicate the presence or absence of image dots at the appropriate picture elements of the dot matrix to form the respective characters. The presence and absence of the image dots are indicated by the dot data bits corresponding to the picture elements, which bits are either "1" or "0". The dot data are prepared according to size data indicative of the size of the characters, as well as the outline data. The use of the outline data eliminates a memory device having a relatively large data storage capacity for storing a large volume of the dot data for all the characters of different sizes available for reproduction, and permits the reproduction of the characters in many different sizes and type styles, with a high degree of image resolving power.

The outline data indicated above usually consists of coordinate data representative of X and Y coordinate values of segment specifying points which determines the positions of straight lines, curves or other segments of the outlines of the characters, and segment type data indicative of the kinds of the outline segments. The segment specifying points for a straight line consist of the start and end points of the straight line, and the segment specifying points for a Bezier curve consist of the start and end points of the curve and two control points which determine a curvature of the curve.

Generally, the outline data is stored in a read-only memory (ROM) or other memory device provided in the relevant output device. In response to an input code signal representative of a given character such as a letter, the corresponding outline data set is retrieved from the memory device, to prepare the corresponding set of dot data. In this arrangement, however, the required data storage capacity of the memory device increases with an increase in the number of the characters which are available for reproduction. For instance, a printer or display capable of printing or displaying the characters according to Level 1 and Level 2 of the Japanese Industrial Standard (JIS) requires a memory device having a larger capacity for storing the outline data, than a printer or display which is capable of printing or displaying only the JIS Level 1 characters.

SUMMARY OF THE INVENTION

It is therefore an object of the present invention to provide a data compressing device for compressing the conventionally prepared normal outline data into compressed outline data whose volume is smaller than that of the normal outline data.

A second object of the invention is to provide a data restoring device suitable for converting such compressed outline data back into the normal outline data.

The first object may be achieved according to one aspect of the present invention, which provides a data compressing device for preparing compressed outline data from normal outline data which represents an outline of a character or other visible representation, the outline consisting of a plurality of segments connected end to end to each other so as to form a closed loop, the normal outline data including coordinate data representative of X and Y coordinate values of a plurality of segment specifying points which determine positions of the segments, and segment type data indicative of a type of each of the segments, the data compressing device comprising: (a) determining means for determining whether or not all of a plurality of successive points of the plurality of segment specifying points which successive points are successively located along the closed loop have a same X coordinate value or a same Y coordinate value; and (b) data compressing means, responsive to the determining means, for omitting the X or Y coordinate value for at least one of the plurality of successive points, to thereby prepare the compressed outline data, if all of the successive points have the same X or Y coordinate value which is equal to the X or Y coordinate value to be omitted.

In the data compressing device of the present invention constructed as described above, the X or Y coordinate value for at least one of the successive segment specifying points is omitted in the compressed outline data, if all of the successive segment specifying points have the same X or Y coordinate value which is equal to the value to be omitted. For instance, the X or Y coordinate values for all but one of the successive points are omitted in the compressed outline data prepared from the normal outline data. Accordingly, the required data storage capacity of the memory device for storing the compressed outline data is considerably smaller than that of the memory device for storing the normal outline data, for a given number of characters to be reproduced.

The above-indicated second object may be achieved according to another aspect of this invention, which provides a data restoring device for converting compressed outline data into normal outline data which represents an outline of a character or other visible representation, the outline consisting of a plurality of segments connected end to end to each other so as to form a closed loop, the compressed outline data including coordinate data representative of X and Y coordinate values of a plurality of segment specifying points which determine positions of the segments, and segment type data indicative of a type of each of the segments, the X or Y coordinate value being omitted for at least one of a plurality of successive points of the plurality of segment specifying points which successive points are successively located along the closed loop, if all of the plurality of successive points have a same X or Y coordinate value which is equal to the X or Y coordinate value to be omitted, the data restoring device comprising: (a) determining means for determining whether or not any one of the X and Y coordinate values of the segment specifying points is absent in the compressed outline data; and (b) data restoring means, responsive to the determining means, for restoring each of the any one of the X and Y coordinate values of the segment specifying points which is absent in the compressed outline data, to thereby prepare the normal outline data, if the determining means determines that any one of the X and Y coordinate values is absent in the compressed outline data.

In the data restoring device of the present invention constructed as described above, the compressed outline data which lacks the X or Y coordinate value for at least one of the successive segment specifying points having the same X or Y coordinate value can be converted into the normal outline data, by adding to the compressed outline data all of the X and Y coordinate values which are absent in the compressed outline data. The thus obtained normal outline data is converted by suitable converting means into corresponding dot data representative of the image dots to form the relevant character of a selected size to be printed, displayed or otherwise reproduced. Thus, the present arrangement requires a memory device having a relatively small capacity for storing the compressed outline data for all the characters available to be reproduced. Accordingly, the cost of the memory device can be lowered, or the memory device having the same capacity can store the outline data for a larger number of characters to be reproduced.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which:

FIG. 1 is a schematic block diagram showing an outline data preparing apparatus incorporating a data processing device which includes a data compressing device constructed according to one embodiment of this invention;

FIG. 2 is a flow chart illustrating an operation of the data processing device of FIG. 1;

FIG. 3 is an illustration showing an outline of character "D" consisting of a plurality of segments in the form of straight lines and Bezier curves;

FIG. 4 is a view indicating normal outline data representative of the character outline, which is processed into compressed outline data or prepared by processing the compressed outline data;

FIG. 6 is a view indicating the compressed outline data obtained by execution of the routine of FIG. 5;

DETAILED DESCRIPTION OF THE PREFERRED EMBODIMENTS

Figure 5A:
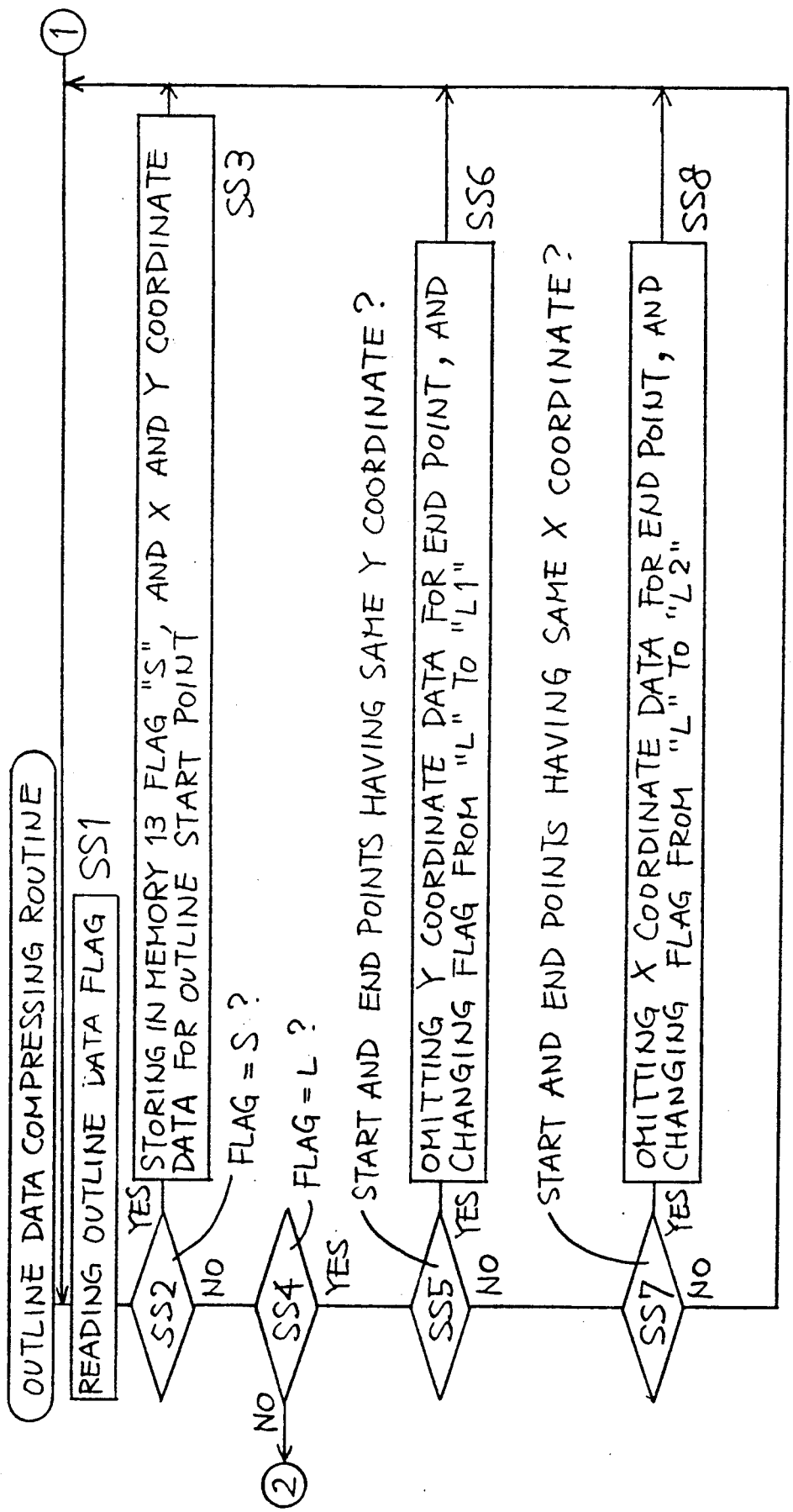
FIGS. 5A-5C are a flow chart illustrating a data compressing routine executed in step S4 of the flow chart of FIG. 2.

Referring first to FIG. 1, there is shown an outline data preparing apparatus 10 for preparing normal outline data representative of characters or other visible representations to be reproduced, and converting the normal outline data into compressed outline data whose volume is smaller than that of the normal outline data. The apparatus 10 includes an image scanner or image reader 11 which optically reads the original characters. More specifically, image signals generated by the image reader 11, which are indicative of the original characters, are applied to a data processing device 12 of the apparatus 10.

The data processing device 12 is a computer adapted to process the received image signals, according to a stored control program, for preparing the normal outline data based on the image signals. The data processing device 12 is further adapted to process the normal outline data to prepare the compressed outline data, which is stored in an outline data memory 13 of the apparatus 10. The data processing device 12 has three functionally different portions, namely, an image signal converting portion 14 for converting the image signals from the image reader 11 into the normal outline data, a data processing control portion 16 connected to the image signal converting portion 14 and the memory 13, and an outline data compressing portion 18 which is controlled by the data processing control portion 16, for compressing the normal outline data in the manner described below in greater detail.

The normal outline data prepared by the image signal converting portion 14 represents an outline of each character which consists of a plurality of segments that are connected end to end to each other so as to form a closed loop, as indicated in FIG. 3 which shows an outer loop of the outline of letter "D", by way of example. The normal outline data includes coordinate data representative of X and Y coordinate values of a plurality of segment specifying points (X1, Y1) through (Xn, Yn) which determine the positions of the individual segments. Functionally, the data processing control portion 16 serves as determining means for determining whether or not all of a plurality of successive points of the segment specifying points which are successively located along the closed loop of the outline of the character have a same X or Y coordinate value, while the outline data compressing portion 18 serves as data compressing means for omitting the X or Y coordinate value for at least one of the above-indicated successive points, to thereby prepare the compressed outline data, when all of the successive points have the same X or Y coordinate value which is equal to the value to be omitted.

Referring to the flow chart of FIG. 2, there is illustrated an operation of the data processing device 12 for preparing the compressed outline data. More specifically, step S1 is initially executed to read the image signals supplied from the image reader 11. Step S1 is followed by step S2 in which the outline of the character being read by the image reader 11 is determined according to a suitable control program, based on the received image signals. Since this control program is well known in the art and is not essential to the understanding of the principle of the present invention, no description of this program is deemed necessary.

As indicated in FIG. 3, by way of example, the outline consists of at least one closed loop which consists of at least one straight line and at least one Bezier curve. Step S2 is followed by step S3 to prepare the coordinate data representative of the X and Y coordinate values of the segment specifying points determining the positions of the straight lines and Bezier curves. In the example of FIG. 3, the outline of letter "D" consists of: a first straight line having a start point (X1, Y1) and an end point (X2, Y2); a first Bezier curve which has a start point (X2, Y2) and an end point (X5, Y5) and whose curvature is determined by a first and a second control point (X3, Y3), (X4, Y4); a second straight line having a start point (X5, Y5) and an end point (X6, Y6); a second Bezier curve which has a start point (X6, Y6) and an end point (X9, Y9) and whose curvature is determined by a first and a second control point (X7, Y7), (X8, Y8); a third straight line having a start point (X9, Y9) and an end point (X10, Y10); and a fourth straight line having a start point (X10, Y10) and an end point (X1, Y1). The above-indicated points (X1, Y1) through (X10, Y10) serve as the segment specifying points.

The normal outline data for letter "D" of FIG. 3 produced by the image signal converting portion 14 is indicated in FIG. 4. The normal outline data include segment type data in the form of flags indicative of the types of the segments of the outline, as well as the coordinate data for the segment specifying points. In the example of FIG. 4, the start point (X1, Y1) of the closed loop is indicated by a flag "S", and the end point of each straight line is indicated by a flag "L". Further, a flag "B" indicates the two control points and the end point of each Bezier curve. The normal outline data also includes a flag "*" indicative of the end of the closed loop, and a flag "!" indicative of the end of the outline data of the relevant character. In the present embodiment, each of the X and Y coordinate values of the segment specifying points is represented by two bytes, while each flag is represented by one byte. Each bezier curve is defined by the following equations (1) and (2):

$$Px(t) = (1-t)^3 P1x + 3(1-t)^2 P2x + 3(1-t)t^2 P3x + t^3 P4x \quad (1)$$

$$Py(t) = (1-t)^3 P1y + 3(1-t)^2 P2y + 3(1-t)t^2 P3y + t^3 P4y \quad (2)$$

where, (P1x, P1y) represents the X and Y coordinate values of the start point P1, while (P4x, P4y) represents the X and Y coordinate values of the end point P4, and (P2x, P2y) and (P3x, P3y) represent the X and Y coordinate values of the first and second control points P2 and P3, respectively. The first control point P2 lies on a straight line which is tangent to the Bezier curve and which passes the start point P1 of the curve, while the second control point P3 lies on a straight line which is tangent to the curve and which passes the end point P4.

Figure 5B:
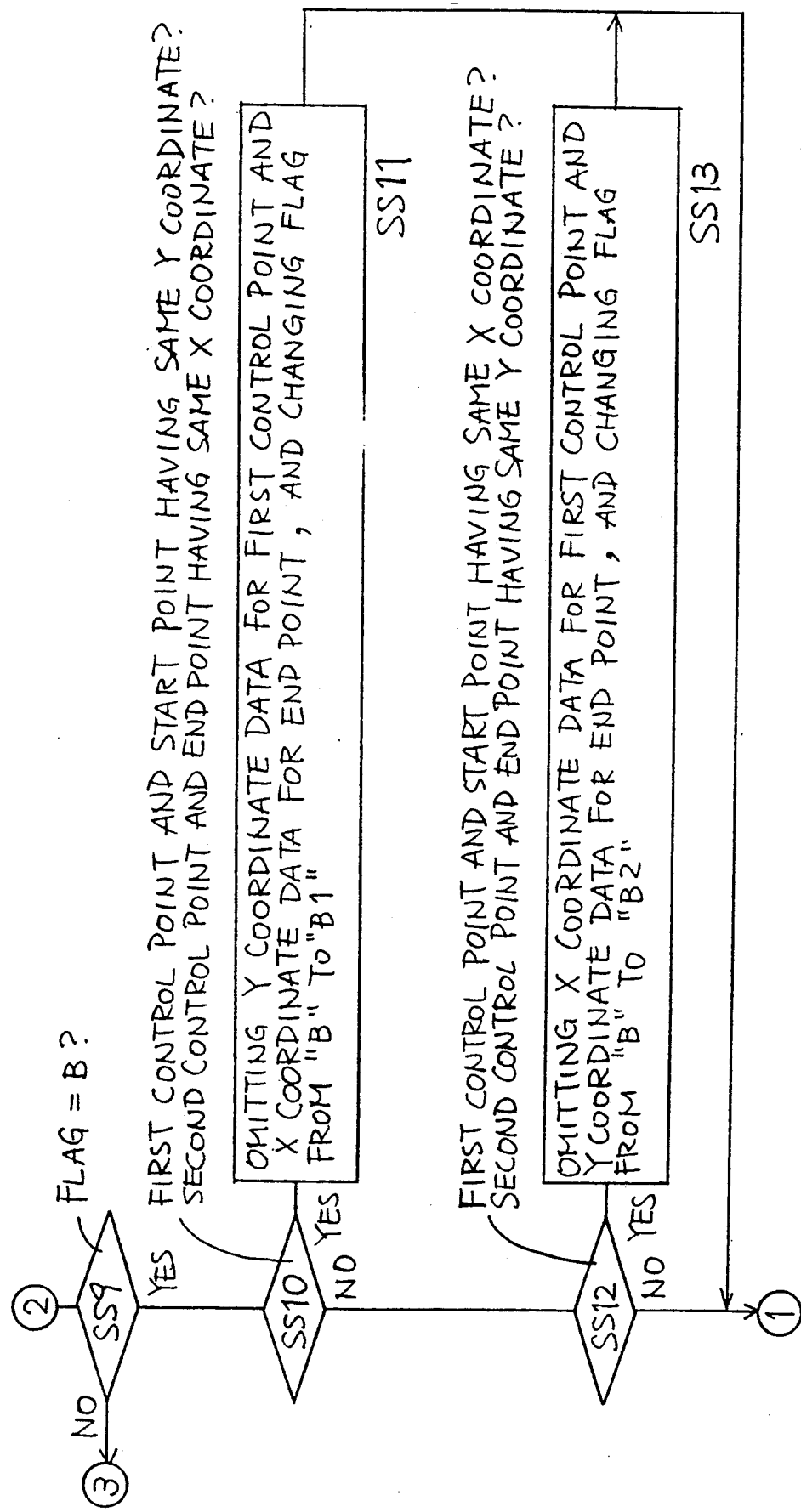
Figure 5C:
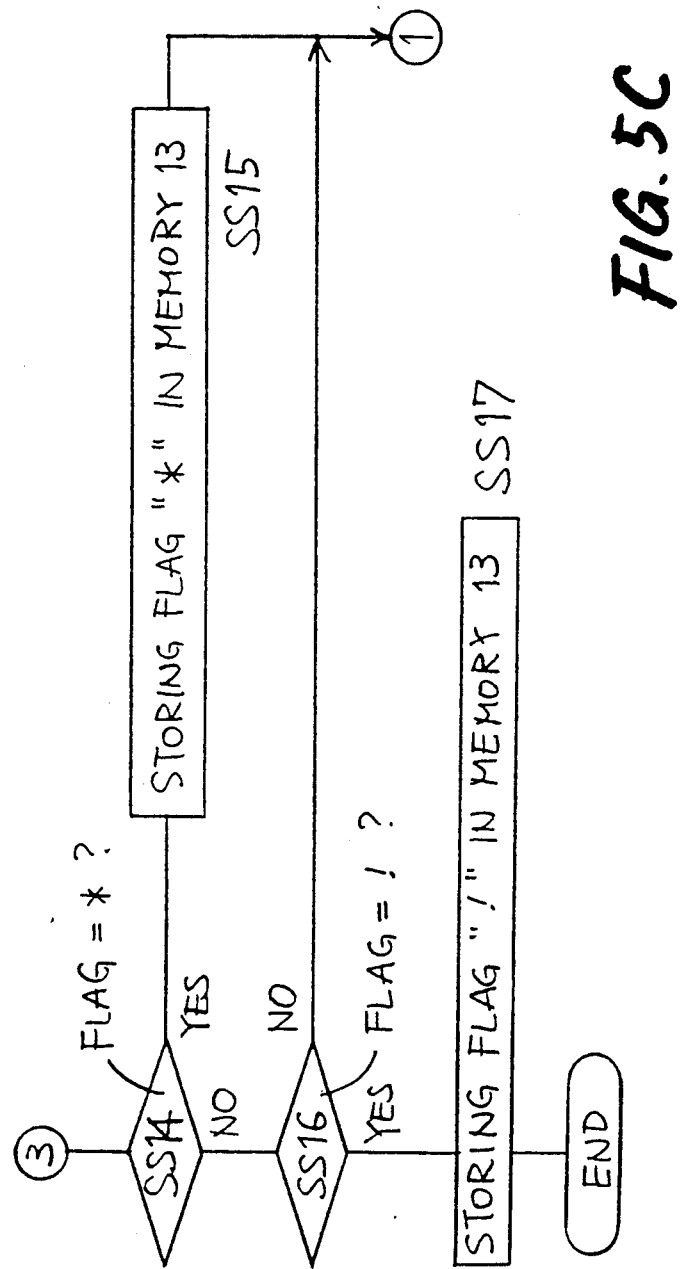

The control flow then goes to step S4 in which a data compressing routine of FIGS. 5A–5C is executed by the data processing control portion 16 and the outline data compressing portion 18, for compressing the normal outline data prepared by the image signal converting portion 14, that is, for preparing the compressed outline data based on the normal outline data. In the data compressing routine of FIG. 5, step SS1 is initially implemented to read the current flag of the normal outline data prepared in step S3. Then, the control flow goes to step SS2 to determine whether the current flag is "S" or not. If an affirmative decision (YES) is obtained in step SS2, the control flow goes to step SS3 to store as part of the compressed outline data the flag "S", and the X and Y coordinate data for the start point (X1, Y1) of the closed loop or outline. Thus, the normal outline data for the start point (X1, Y1) is not compressed, and the compressed data for the start point (X1, Y1) is the same as the normal outline data, as indicated in the uppermost rows in FIGS. 4 and 6, which indicate the sets of normal and compressed outline data for the start point (X1, Y1). if a negative decision (NO) is obtained in step SS2, step SS4 is implemented to determine whether the current flag of the normal outline data is "L" or not.

If an affirmative decision (YES) is obtained in step SS4, the control flow goes to step SS5 to determine whether the Y coordinate value of the end point of the relevant straight line indicated by the flag "L" is the same as the Y coordinate value of the start point of the relevant straight line. If an affirmative decision (YES) is obtained in step SS5, step SS6 is implemented to omit the Y coordinate value of the end point of the relevant straight line and change the flag from "L" to "L1", in preparing the set of compressed outline data for this straight line. If a negative decision (NO) is obtained in step SS5, the control flow goes to step SS7 to determine whether the X coordinate value of the end point of the relevant straight line is the same as the X coordinate value of the start point of the same straight line. If an affirmative decision (YES) is obtained in step SS7, step SS8 is implemented to omit the X coordinate value of the end point of the relevant straight line and change the flag "L" to "L2", in preparing the set of compressed outline data for this straight line. If a negative decision (NO) is obtained in step SS7, the control flow goes back to step SS1, and the above-indicated steps are repeated. For preparing the set of compressed outline data from the set of normal outline data for the end point (X2, Y2) of the first straight line (start point of the first Bezier curve) indicated in the second row of FIG. 4, the flag "L" is changed to "L1", and the Y coordinate value Y2 is omitted in the compressed outline data. Namely, only the flag "L1" and the X coordinate data X2 is stored in the memory 13 for the end point (X2, Y2).

If a negative decision (NO) is obtained in step SS4, the control flow goes to step SS9 to determine whether the current flag of the normal outline data is "B" or not. If an affirmative decision (YES) is obtained in step SS9, step SS10 is implemented to determine whether the Y coordinate value of the first control point of the relevant Bezier curve indicated by the flag "B" is the same as the Y coordinate value of the start point of the relevant Bezier curve, while at the same time the X coordinate value of the second control point of the relevant Bezier curve is the same as the X coordinate value of the end point of the relevant curve. If an affirmative decision (YES) is obtained in step SS10, namely, if the above-indicated two conditions are satisfied, the control flow goes to step SS11 to omit the Y coordinate value of the first control point of the relevant Bezier curve and the X coordinate value of the end point of the same curve, and change the flag "B" to "B1", in preparing the set of compressed outline data for the relevant Bezier curve. If a negative decision (NO) is obtained in step SS10, step SS12 is executed to determine whether the X coordinate value of the first control point of the relevant Bezier curve is the same as the X coordinate value of the start point of that curve, while at the same time the Y coordinate value of the second control point of the curve is the same as the Y coordinate value of the end point of the curve. If an affirmative decision (YES)

is obtained in step SS12, step SS13 is implemented to omit the X coordinate value of the first control point and the Y coordinate value of the end point of the relevant curve, and change the flag "B" to "B2", in preparing the set of compressed outline data for the relevant Bezier curve. If a negative decision (NO) is obtained in step SS12, the control flow returns to step SS1. In preparing the set of compressed outline data from the set of normal outline data (indicated in the third row in FIG. 4) for the first and second control points (X3, Y3), (X4, y4) and the end (X5, Y5) of the first Bezier curve, the flag "B" is changed to "B1" and only the coordinate data X3, X4, Y4 and Y5 are stored in the memory 13, with the coordinate data Y3 and X5 being omitted in the compressed outline data, as indicated in the third row in FIG. 6.

With the above-indicated steps being repeatedly executed, the batch of compressed outline data as indicated in FIG. 6 is prepared from the normal outline data as indicated in FIG. 4. Namely, a negative decision (NO) obtained in step SS9 causes the control flow to go to step SS14 to determine whether the current flag of the normal outline data is "*" or not. If an affirmative decision (YES) is obtained in step SS14, step SS15 is implemented to store the flag "*" in the memory 13. Then, step SS16 is implemented to determine whether the current flag of the normal outline data is "!" or not. If an affirmative decision (YES) is obtained in step SS16, step SS17 is executed to store the flag "!" in the memory 13. Thus, the compressed outline data as indicated in FIG. 6 is prepared and stored in the outline data memory 13.

The compressed outline data prepared by the data processing control portion 16 and outline data compressing portion 18 is smaller in volume than the normal outline data prepared by the image signal converting portion 14. Accordingly, the compressed outline data can be stored in a relatively inexpensive, relatively small-capacity memory device such as a read-only memory (ROM) provided in a printer or a display device. If the storage capacity of the memory device is constant, the number of the characters that can be stored in the memory device can be considerably increased, according to the present arrangement. An experiment conducted by the applicants indicated about 20% reduction of the required memory capacity of a memory device for storing the compressed outline data prepared according to the present invention, as compared with the required memory capacity for storing the corresponding normal outline data conventionally prepared for 70000 characters including letters according to the JIS LEVEL 1 and LEVEL 2, and symbols, which characters are available on a certain printer.

Figure 7:
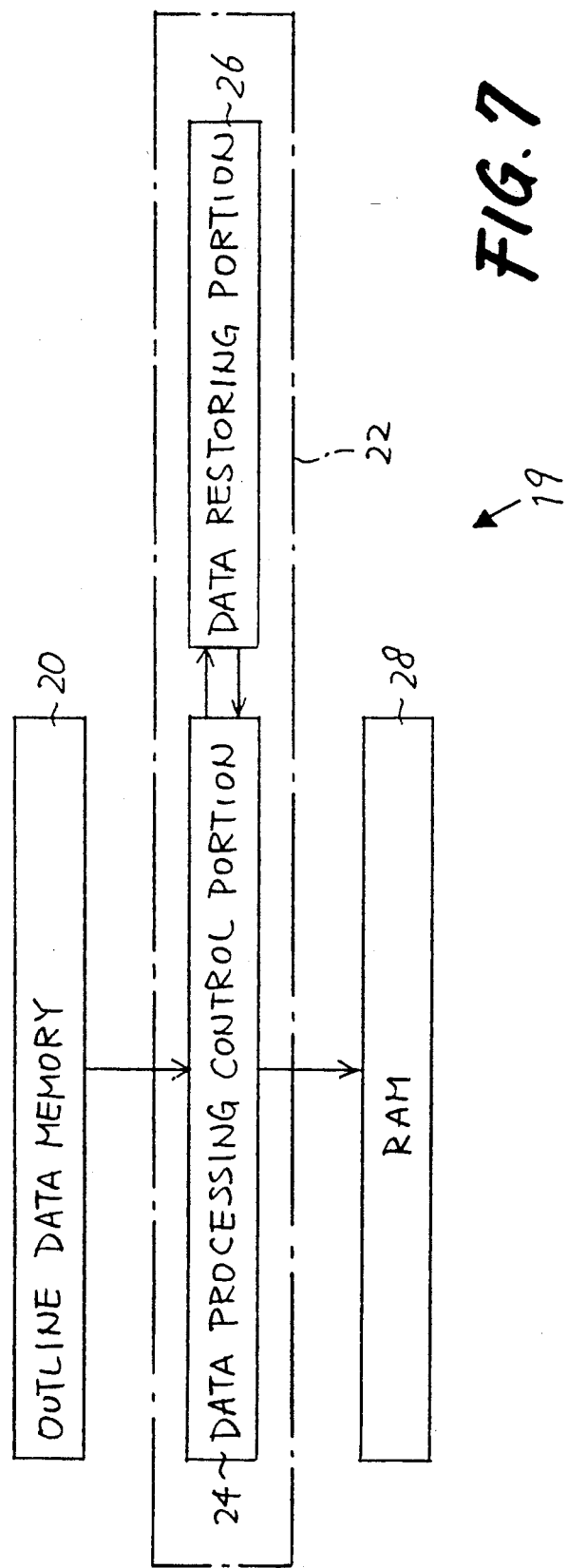
FIG. 7 is a schematic block diagram showing a data restoring device constructed according to another embodiment of the present invention, for converting the compressed data into the normal outline data.

Referring to FIG. 7, there is shown a printer indicated generally at 19, which has an outline data memory 20 in the form of a read-only memory (ROM) of a floppy disk which stores a batch of compressed outline data (as indicated in FIG. 6 by way of example) prepared as described above. The printer 19 further has a data processing device 22 for converting the compressed outline data stored in the memory 20 into a corresponding batch of normal outline data (as indicated in FIG. 4 by way of example). The compressed outline data represent all characters available for reproduction on the printer 19. The data processing device 22 includes a data processing control portion 24 connected to the outline data memory 20 and a random-access memory (RAM) 28, and a data restoring portion 26 connected to the data processing control portion 24. As the data processing control portion 24 receives code signals indicative of characters to be printed, the control portion 24 reads corresponding sets of the compressed outline data from the outline data memory 20, that is, flags indicative of the characters and the X and Y coordinate data corresponding to the flags. The data processing control portion 24 functions as means for determining whether or not any one of the X and Y coordinate values of the segment specifying points of the outline of each character is absent in the compressed outline data. If any X or Y coordinate value is found omitted in the compressed outline data, the data restoring portion 26 operates as data restoring means for restoring each of the omitted X and Y coordinate values which are omitted in the compressed outline data, to thereby prepare the corresponding normal outline data usable for reproduction of the relevant character. The thus prepared normal outline data is stored in the RAM 28. Thus, the data processing device 22 incorporates a data restoring device for converting the compressed outline data into the corresponding normal outline data. The normal outline data is converted by the data processing device 22 into corresponding dot data indicative of the presence and absence of image dots which form the relevant character. In the present printer 19, the character is printed and displayed according to the dot data.

Figure 8A:
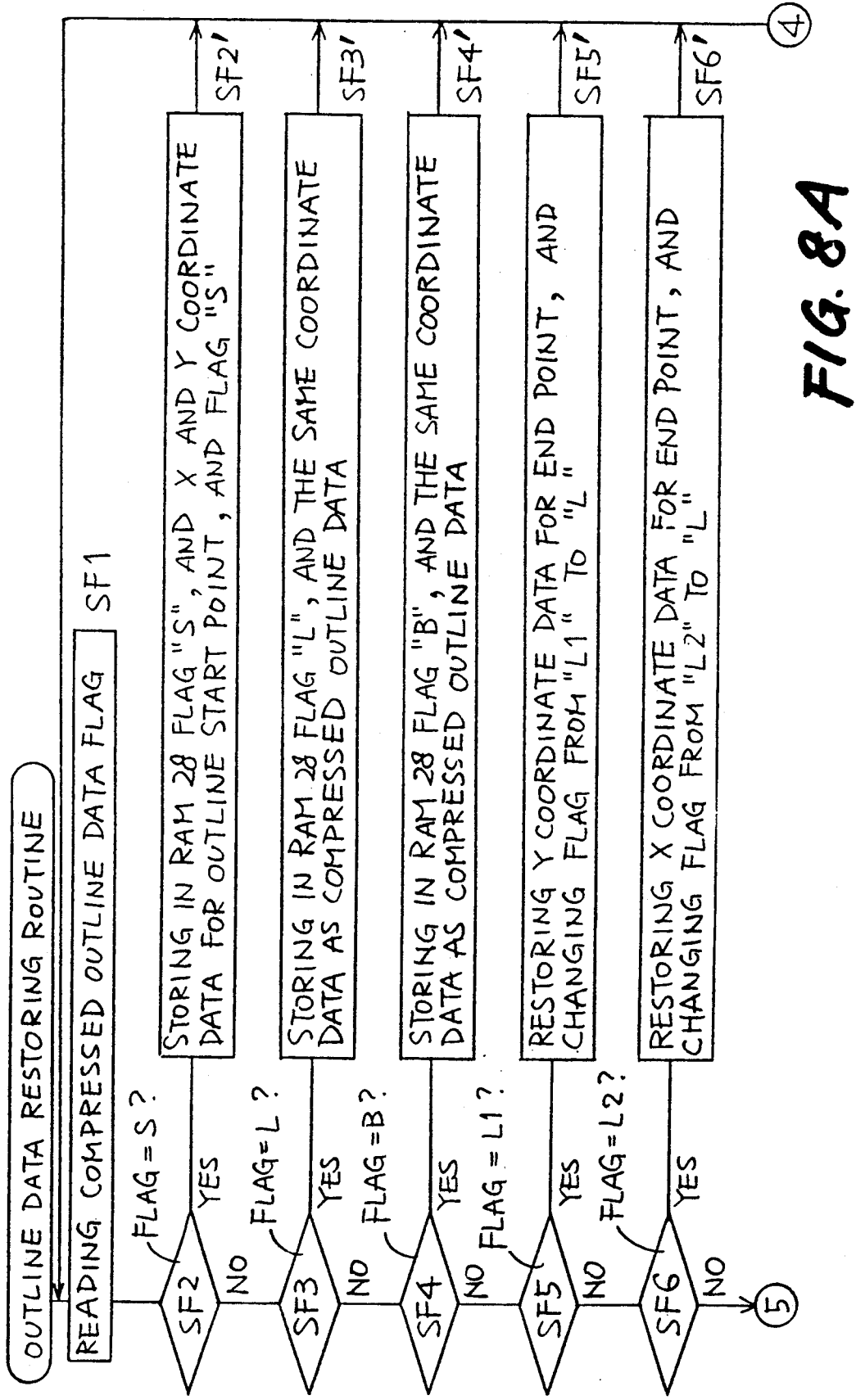
FIGS. 8A and 8B are a flow chart illustrating a data restoring routine executed by the data restoring device of FIG. 7.
Figure 8B:
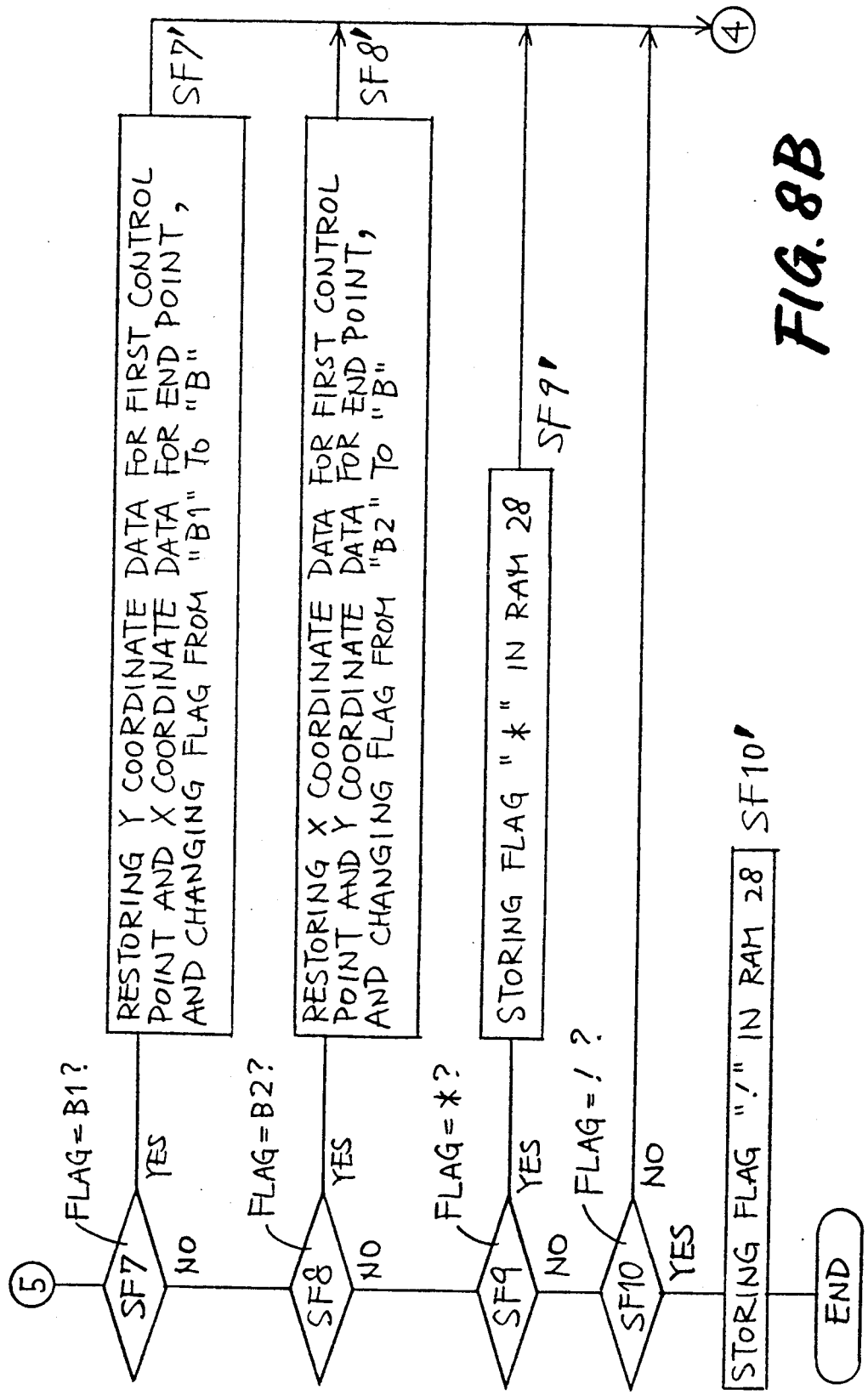

Referring to the flow chart of FIGS. 8A and 8B, there will be described an outline data restoring routine executed by the data processing portion 22 to convert the compressed outline data into the corresponding normal outline data. In the outline data restoring routine, step SF1 is initially implemented to read the current flag of the compressed outline data stored in the memory 20. Then, the control flow goes to step SF2 to determine whether the current flag is "S" or not. If an affirmative decision (YES) is obtained in step SF2, step SF2' is implemented to store in the RAM 28 the flag "S" and the X and Y coordinate data (X1, Y1) of the start point of the outline of the relevant character, as indicated in the uppermost row of FIG. 6. If a negative decision (NO) is obtained in step SF2, the control flow goes to step SF3 to determine whether the current flag is "L" or not.

If an affirmative decision (YES) is obtained in step SF3, step SF3' is executed to store in the RAM 28 the flag "L" and the X and Y coordinate values of the end point of the relevant straight line indicated by the flag "L". If a negative decision (NO) is obtained in step SF3, the control flow goes to step SF4 to determine whether the current flag of the compressed outline data is "B" or not. If an affirmative decision (YES) is obtained in step SF4, step SF4' to store in the RAM 28 the flag "B"and the X and Y coordinate values of the first and second control points and end point of the Bezier curve indicated by the flag "B". In the compressed outline data indicated in FIG. 6, there exist no flags "L" and "B", and a negative decision (NO) is obtained in steps SF3 and SF4, whereby the control flow goes to step SF5 to determine whether the current flag is "L1" or not.

If an affirmative decision (YES) is obtained in step SF5, step SF5' is implemented to restore the Y coordinate value of the end point of the straight line indicated by the flag "L1", and change the flag "L1" to "L", in preparing the set of normal outline data for the relevant straight line. The restored Y coordinate value is the same as the Y coordinate value of the start point of the relevant straight line. If a negative decision (NO) is obtained in step SF5, step SF6 is implemented to determine whether the current flag is "L2" or not. If an affirmative decision (YES) is obtained in step SF6, step SF6' is executed to restore the X coordinate value of the end point of the relevant straight line indicated by the flag "L2", and change the flag "L2" to "L", in preparing the set of normal outline data for the relevant straight line. The restored X coordinate value is the same as the X coordinate value of the start point of the relevant straight line. With steps SF5' and SF6' executed as described above, the sets of compressed outline data indicated in the second, fourth and sixth rows in FIG. 6 are converted into sets of normal outline data indicated in the corresponding rows in FIG. 4.

Then, the control flow goes to step SF7 to determine whether the current flag of the compressed outline data is "B1" or not. If an affirmative decision (YES) is obtained in step SF7, step SF7' is implemented to restore the Y coordinate value of the first control point of the Bezier curve indicated by the flag "B1", and the X coordinate value of the end point of the same Bezier curve, and change the flag "B1" to "B", whereby the set of normal outline data for the relevant Bezier curve is prepared. The restored Y coordinate value is the same as the Y coordinate value of the start point of the relevant Bezier curve, while the restored X coordinate value is the same as the X coordinate value of the second control point of the curve. If a negative decision (NO) is obtained in step SF7, the control flow goes to step SF8 to determine whether the current flag is "B2" or not. If an affirmative decision (YES) is obtained in step SF8, step SF8' is implemented to restore the X coordinate value of the first control point of the Bezier curve indicated by the flag "B2", and the Y coordinate value of the end point of the relevant Bezier curve, and change the flag "B2" to "B", whereby the set of normal outline data for the relevant Bezier curve is prepared. The restored X coordinate value is the same as the X coordinate value of the start point of the relevant curve, while the restored Y coordinate value is the same as the Y coordinate value of the second control point of the curve.

With the above-indicated steps being repeatedly executed, the sets of normal outline data indicated in the first through sixth rows of FIG. 6 are prepared from the corresponding sets of the compressed outline data. Then, step SF9 is executed to determine whether the current flag is "*" or not. If an affirmative decision (YES) is obtained in step SF9, step SF9' is executed to store the flag "*" in the RAM 28. Then, step SF10 is executed to determine whether the current flag is "!" or not. When an affirmative decision (YES) is obtained in step SF10, step SF10' is executed to store the flag "!" in the RAM 28. Thus, the compressed outline data of FIG. 6 is converted into the normal outline data of FIG. 4, which is stored in the RAM 28.

While the present invention has been described in its presently preferred forms, it is to be understood that the invention is not limited to the details of the illustrated embodiments, but may be otherwise embodied.

For instance, the outline data may represent an outline which consists of at least one straight line, and at least one circular arc rather than at least one Bezier curve used in the illustrated embodiments. Further, the Bezier curves used in the illustrated embodiments may be replaced by third-order spline curves. The principle of the present invention is also applicable to outline data which represents an outline consisting of a relatively large number of short straight lines which are connected end to end so as to form a closed loop.

In the illustrated embodiments, the same X or Y coordinate value of a plurality of successive segment specifying points is omitted for all but one of these successive segment specifying points which follows the first one of the successive segment specifying points as viewed in the direction in which the successive points are processed. However, the same X or Y coordinate may be omitted for at least one of the successive segment specifying points, e.g., the first one or first and second ones of the successive segment specifying points.

It is to be understood that the present invention may be embodied with various other changes, modifications and improvements, which may occur to those skilled in the art, without departing from the spirit and scope of the present invention defined in the following claims.

What is claimed is:

1. A data compressing device for preparing compressed outline data from normal outline data, comprising:

determining means for processing said normal outline data, said normal outline data representing an outline of a character or other visible representation, said outline consisting of a plurality of segments connected end to end to each other so as to form a closed loop, said normal outline data including coordinate data representative of X and Y coordinate values of a plurality of segment specifying points which determine positions of said segments, and segment type data indicative of a type of each of said segments, said determining means determining whether or not all of a plurality of successive points of said plurality of segment specifying points which successive points are successively located along said closed loop have a same X coordinate value or a same Y coordinate value; and data compressing means, responsive to said determining means, for omitting said X or Y coordinate value for at least one of said plurality of successive points, to thereby prepare said compressed outline data, if said all of the successive points have said same X or Y coordinate value which is equal to said X or Y coordinate value to be omitted.

2. A data compressing device according to claim 1, wherein said at least one of said successive points whose X or Y coordinate value is omitted consists of all but one of said plurality of successive points.

3. A data compressing device according to claim 2, wherein said one of said plurality of successive points is a first one of said plurality of successive points as viewed in a direction corresponding to an order in which sets of said normal outline data for said plurality of segments are sequentially processed to prepare said compressed outline data.

4. A data compressing device according to claim 1, wherein said plurality of segments consist of at least one straight line and at least one Bezier curve.

5. A data compressing device according to claim 4, wherein said segment specifying points consists of start and end points of each of said at least one straight line, start and end points of each of said at least one Bezier curve, and two control points which determine a curvature of each said Bezier curve.

6. A data restoring device for converting compressed outline data into normal outline data which represents an outline of a character or other visible representation, said outline consisting of a plurality of segments connected end to end to each other so as to form a closed loop, said data restoring device comprising:

determining means for processing said compressed outline data, said compressed outline data including coordinate data representative of X and Y coordinate values of a plurality of segment specifying points which determine positions of said segments, and segment type data indicative of a type of each of said segments, the X or Y coordinate value being omitted for at least one of a plurality of successive points of said plurality of segment specifying points which successive points are successively located along said closed loop, if all of said plurality of successive points have a same X or Y coordinate value which is equal to said X or Y coordinate value to be omitted;

said determining means determining whether or not any one of the X and Y coordinate values of said segment specifying points is absent in said compressed outline data; and data restoring means, responsive to said determining means, for restoring each of said any one of the X and Y coordinate values of said segment specifying points which is absent in said compressed outline data, to thereby prepare said normal outline data, if said determining means determines that said any one of the X and Y coordinate values is absent in said compressed outline data.

7. A data restoring device according to claim 6, wherein said plurality of segments consist of at least one straight line and at least one Bezier curve.

8. A data restoring device according to claim 7, wherein said segment specifying points consists of start and end points of each of said at least one straight line, start and end points of each of said at least one Bezier curve, and two control points which determine a curvature of each said Bezier curve.

9. A data restoring device according to claim 6, wherein said at least one of said successive points whose X or Y coordinate value is omitted consists of all but one of said plurality of successive points.

10. A data restoring device according to claim 9, wherein said one of said plurality of successive points is a first one of said plurality of successive points as viewed in a direction corresponding to an order in which sets of said compressed outline data for said plurality of segments are sequentially processed to prepare said normal outline data.

11. A data compressing device for preparing compressed outline data from normal outline data which represents an outline of a character or other visible representation, said outline consisting of a plurality of segments connected end to end to each other so as to form a closed loop, said normal outline data including coordinate data representative of X and Y coordinate values of a plurality of segment specifying points which determine positions of said segments, and segment type data indicative of a type of each of said segments, said data compressing device comprising:

determining means for determining whether or not all of a plurality of successive points of said plurality of segment specifying points which successive points are successively located along said closed loop have a same X coordinate value or a same Y coordinate value; and data compressing means, responsive to said determining means, for omitting said X or Y coordinate value for at least one of said plurality of successive points, to thereby prepare said compressed outline data, if said all of the successive points have said same X or Y coordinate value which is equal to said X or Y coordinate value to be omitted, said coordinate data consisting of data representative of X and Y coordinate values of a start point of said closed loop of said outline, and X and Y coordinate values of said plurality of segments specifying points which determine the positions of said plurality of segments connected end to end to each other to form said closed loop, said segment type data consisting of a flag indicative of said start point of said closed loop, flags indicative of said plurality of segments, respectively, and a flag indicative of an end of said closed loop.

12. A data restoring device for converting compressed outline data into normal outline data which represents an outline of a character or other visible representation, said outline consisting of a plurality of segments connected end to end to each other so as to form a closed loop, said compressed outline data including coordinate data representative of X and Y coordinate values of a plurality of segment specifying points which determine positions of said segments, and segment type data indicative of a type of each of said segments, the X or Y coordinate value being omitted for all but a first one of a plurality of successive points of said plurality of segment specifying points which successive points are successively located along said closed loop, if all of said plurality of successive points have a same X or Y coordinate value which is equal to said X or Y coordinate value to be omitted, said first one being a first point as viewed in a direction corresponding to an order in which sets of said compressed outline data for said plurality of segments are sequentially processed to prepare said normal outline data, said data restoring device comprising:

determining means for determining whether or not any one of the X or Y coordinate values of said segment specifying points is absent in said compressed outline data; and data restoring means, responsive to said determining means, for restoring each of said any one of the X and Y coordinate values of said segment specifying points which is absent in said compressed outline data, to thereby prepare said normal outline data, if said determining means determines that said any one of the X and Y coordinate values is absent in said compressed outline data, said data restoring means preparing said normal outline data, by adding to said compressed outline data the X or Y coordinate value of each of said all but said first one of said plurality of successive points.

13. A data restoring device for converting compressed outline data into normal outline data which represents an outline of a character or other visible representation, said outline consisting of a plurality of segments connected end to end to each other so as to form a closed loop, said compressed outline data including coordinate data representative of X and Y coordinate values of a plurality of segment specifying points which determine positions of said segments, and segment type data indicative of a type of each of said segments, the X or Y coordinate value being omitted for all but a first one of a plurality of successive points of said plurality of segment specifying points which successive points are successively located along said closed loop, if all of said plurality of successive points have a same X or Y coordinate value which is equal to said X or Y coordinate value to be omitted, said data restoring device comprising:

- determining means for determining whether or not any one of the X or Y coordinate values of said segment specifying points is absent in said compressed outline data; and
- data restoring means, responsive to said determining means, for restoring each of said any one of the X and Y coordinate values of said segment specifying points which is absent in said compressed outline data, to thereby prepare said normal outline data, if said determining means determines that said any one of the X and Y coordinate values is absent in said compressed outline data.

said normal outline data including said segment type data, and coordinate data consisting of data representative of X and Y coordinate values of a start point of said closed loop of said outline, and X and Y coordinate values of said plurality of segment specifying points which determine the positions of said plurality of segments connected end to end to each other to form said closed loop, said segment type data consisting of a flag indicative of said start point of said closed loop, flags indicative of said plurality of segments, respectively, and a flag indicative of an end of said closed loop.

* * * * *